United States Patent Office 2,977,367
Patented Mar. 28, 1961

2,977,367

YOHIMBINE O-(LOWER ALKYL) SULFONATES

Patrick A. Diassi, Westfield, N.J., assignor to Olin Mathieson Chemical Corporation, New York, N.Y., a corporation of Virginia No Drawing. Filed Aug. 5, 1958, Ser. No. 753,206

4 Claims. (Cl. 260—287)

This invention relates to the synthesis of alkaloids and, more particularly, to the preparation of 17-desoxy-α-yohimbine and other esters of 17-desoxy-α-yohimbic acid.

In accordance with the process of this invention the esters of 17-desoxy-α-yohimbic acid are prepared by interacting α-yohimbine or alloyohimbine with an organic sulfonic acid derivative thereby yielding the corresponding 17-sulfonyloxy derivative. Although any organic sulfonic acid derivative such as a sulfonyl halide may be used, the preferred reactants are the lower alkane sulfonyl chlorides, such as methanesulfonyl chloride and ethanesulfonyl chloride, whereby certain new intermediates of this invention of the formula

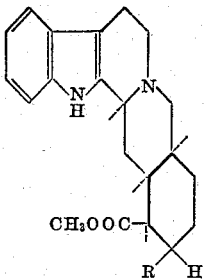

wherein R is either α-(lower alkane)sulfonyloxy or β-(lower alkane)-sulfonyloxy, are formed. The reaction is preferably conducted in the presence of a hydrogen chloride acceptor, such as an organic base as exemplified by pyridine, in the cold (i.e. temperature below room temperature).

The sulfonic acid esters thus formed are then interacted with a base, such as an alkali metal hydroxide (e.g. potassium hydroxide) to yield apo-α-yohimbic acid, a new compound having the formula:

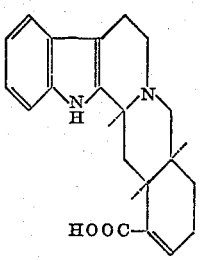

The reaction is preferably conducted at an elevated temperature, such as the reflux temperature of the solvent, if any, employed in the reaction mixture.

Apo-α-yohimbic acid may then be esterified, as by treatment with a diazo(lower alkane) such as diazomethane and diazoethane to yield the respective 16-esters (e.g. apo-α-yohimbine) which are new compounds of the general formula

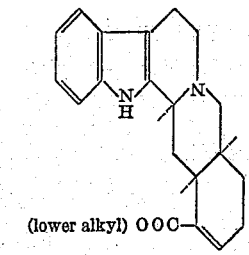

Apo-α-yohimbine or a 16-ester thereof is then catalytically hydrogenated as by treatment with hydrogen in the presence of a noble metal catalyst to yield 17-desoxy-α-yohimbic acid or a 16-ester thereof of the general formula:

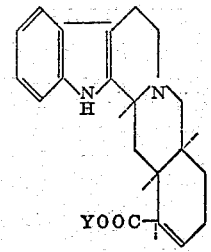

wherein Y is hydrogen or lower alkyl (preferably methyl). If desired, 17-desoxy-α-yohimbic acid (or a 16 ester thereof) can be converted to an acid-addition salt, particularly a non-toxic acid-addition salt, in the usual manner by treating with the desired acid. Among the suitable acids may be mentioned inorganic acids, such as the hydrohalic acids (e.g. hydrochloric and hydrobromic acid), sulfuric acid, phosphoric acid, and nitric acid; and organic acids, such as acetic, tartaric, succinic, oxalic, maleic and citric acid.

17-desoxy-α-yohimbic acid, together with the 16-ester and salt derivatives thereof, is a physiologically active substance which possesses adrenolytic activity. Thus, these compounds can be used in lieu of known adrenolytic compounds such as phentolamine [2-N-[p'-tolyl-N-(m'-hydroxyphenyl)-aminomethyl]-imidazoline], in the treatment of peripheral vascular diseases, or the diagnosis of pheochromocytoma, for which purpose they are administered perorally or parenterally in the same manner as phentolamine.

The following examples illustrate the invention:

EXAMPLE 1

*α-Yohimbine O-mesylate*

A solution of 1.99 g. (5.61 mmols) of α-yohimbine in 60 ml. of dry pyridine is cooled in an ice bath and to this is added slowly a solution of 1.67 g. (14.59 mmols) of methanesulfonyl chloride in 24 ml. of dry pyridine. The reaction is protected from moisture, the ice bath removed and the mixture left at room temperature overnight. The solution is then concentrated to dryness in vacuo and the residue distributed between chloroform and 10% ammonium hydroxide. The chloroform extract is washed twice with water dried over sodium sulfate and concentrated to dryness, in vacuo, yielding about 2.81 g. of a dark amorphous powder. Crystallization of this powder with methanol gives about 1.85 g. of α- yohimbine O-mesylate M.P. about 189–190° C., $[\alpha]_D^{29}$ +14.6° (Chf)

$\lambda_{max}^{Nujol}$ 2.97µ, 5.77µ, 7.48–7.60µ, 8.60–8.70µ

*Analysis.*—Calcd. for $C_{22}H_{28}O_5N_2S$ (432.53): C, 61.09; H, 6.52; N, 6.48. Found: C, 61.22; H, 6.33; N, 6.22; Neut. Eq. (HClO$_4$), 433.

EXAMPLE 2

Alloyohimbine O-mesylate

A solution of 171 mg. (0.48 mmol) of alloyohimbine in 7 ml. of dry pyridine is treated with 0.19 g. (1.7 mmols) of methanesulfonyl chloride and the solution left overnight at room temperature. The pyridine is then removed in vacuo, and 15 ml. of chloroform is added. The chloroform solution is then washed successively with 10% ammonium hydroxide and twice with water. It is dried over sodium sulfate and evaporated to dryness. Crystallization from methanol gives alloyohimbine O-mesylate (about 68 mg.) $[\alpha]_D^{25}$—16° pyridine)

$\lambda_{max}^{Nujol}$ 2.97µ, 5.78µ, 7.46µ, 8.56µ

*Analysis.*—Calcd. from $C_{22}H_{28}O_5N_2S$ (432.53) C, 61.09; H, 6.52; N, 6.48. Found: C, 61.36; H, 6.83; N, 6.28.

EXAMPLE 3

Apo-α-yohimbic acid

A suspension of 359 mg. of α-yohimbine O-mesylate in 10 ml. of 2 N KOH in 50% aqueous methanol is refluxed on a steam bath for 3 hours during which time the compound slowly dissolves. The reflux condenser is then removed and the heating continued for an additional half hour to remove most of the methanol. After cooling the pH is adjusted to 6.0 with acetic acid whereupon the apo-α-yohimbic acid precipitates. It is filtered, washed with a little water and dried to give about 210 mg., M.P. about 302–304° C.

$\lambda_{max}^{Nujol}$ 3.10–3.17µ, 6.06µ, 6.46µ

*Analysis.*—Calcd. for $C_{20}H_{22}O_2N_2 \cdot \frac{1}{2}H_2O$: C, 72.47; H, 6.99; N, 8.45. Found: C, 72.50; H, 6.91; N, 8.20.

Similar treatment of alloyohimbine-O-mesylate gives material which is identical with the apo-α-yohimbic acid.

EXAMPLE 4

Apo-α-yohimbine

Apo-α-yohimbic acid (89.1 mg.) is suspended in 10 ml. of methanol and an ethanol solution of diazomethane is added dropwise until the amino acid dissolves and a yellow color perists. After standing at room temperature for 30 minutes the solution is evaporated to dryness and the residue crystallized from methanol-water to give about 70 mg. of apo-α-yohimbine, M.P. about 171–172° C., $[\alpha]_D$ —127° (pyridine)

$\lambda_{Nujol}^{max}$ 2.96µ, 5.85µ, 6.11µ

*Analysis.*—Calcd. for $C_{21}H_{24}O_2N_2$ (336.42): C, 74.97; H, 7.19; N, 8.33. Found: C, 75.00; H, 7.01; N, 8.22.

Similarly, by substituting other diazo(lower alkanes), such as diazoethane for the diazomethane in Example 4, the corresponding 16-lower alkyl apo-α-yohimbates, such as 16-ethyl apo-α-yohimbate, are formed.

EXAMPLE 5

17-desoxy-α-yohimbine

A solution of 84 mg. of apo-α-yohimbine in 20 ml. of absolute ethanol is hydrogenated at room temperature and atmospheric pressure using 53 mg. of platinum oxide catalyst. After 18 hours the catalyst is filtered off, the solution evaporated to dryness in vacuo and the residue crystallized from methanol-water to give about 60 mg. of 17-desoxy-α-yohimbine, M.P. about 210–212° C. $[\alpha]_D^{25}$—12.2° (pyridine)

$\lambda_{max}^{Nujol}$ 2.93µ, 5.82µ

*Analysis.*—Calcd. for $C_{21}H_{26}O_2N_2$ (338.43): C, 74.52; H, 7.74. Found: C, 74.49; H, 7.74; N.E. (HClO$_4$) 337.

Similarly, by substituting apo-α-yohimbic acid and other 16-esters of apo-α-yohimbic acid, such as 16-ethyl apo-α-yohimbate, for the apo-α-yohimbine in the procedure of Example 5, 17 desoxy-α-yohimbic acid and other 16-esters thereof, such as the ethyl ester, are formed, respectively.

The invention may be variously otherwise embodied within the scope of the appended claims.

What is claimed is:
1. α-Yohimbine O-(lower alkyl)sulfonate.
2. Alloyohimbine O-(lower alkyl)sulfonate.
3. α-Yohimbine O-mesylate.
4. Alloyohimbine O-mesylate.

References Cited in the file of this patent

Janot et al: Bull. Soc. Chimique (France), vol. 16, pp. 509–12 (1949).

Beilstein: Handbuch der Organischen Chemie, Band 25, Ind. supp. (1954), pp. 200, 201.

Weissberger (Ed.): "Technique of Organic Chemistry," vol. 2, 2nd ed., Interscience, N.Y. (1956), page 96.